United States Patent [19]

Landers

[11] Patent Number: 5,092,375

[45] Date of Patent: Mar. 3, 1992

[54] LIQUID BARRIER SYSTEM

[76] Inventor: Phillip G. Landers, 1119 Overlook Ct., San Ramon, Calif. 94583

[21] Appl. No.: 557,684

[22] Filed: Jul. 25, 1990

[51] Int. Cl.⁵ .................... B65B 1/04; F16L 55/00
[52] U.S. Cl. ................................ 141/1; 138/89; 138/103
[58] Field of Search .............. 141/1, 9, 98; 138/89, 138/103, 108; 405/154, 157; 285/925

[56] References Cited

U.S. PATENT DOCUMENTS 4,357,960 11/1982 Han ........................................ 138/89

Primary Examiner—Henry J. Recla
Assistant Examiner—David J. Walczak
Attorney, Agent, or Firm—Thomas R. Lampe

[57] ABSTRACT

A system for forming a barrier in a passageway wherein at least one container having a permeable outer wall and containing a particulate hydrophilic material is brought into engagement with liquid, positioned in the passageway, and subjected to pressure to force some of the moistened particulate hydrophilic material out of the container.

22 Claims, 5 Drawing Sheets

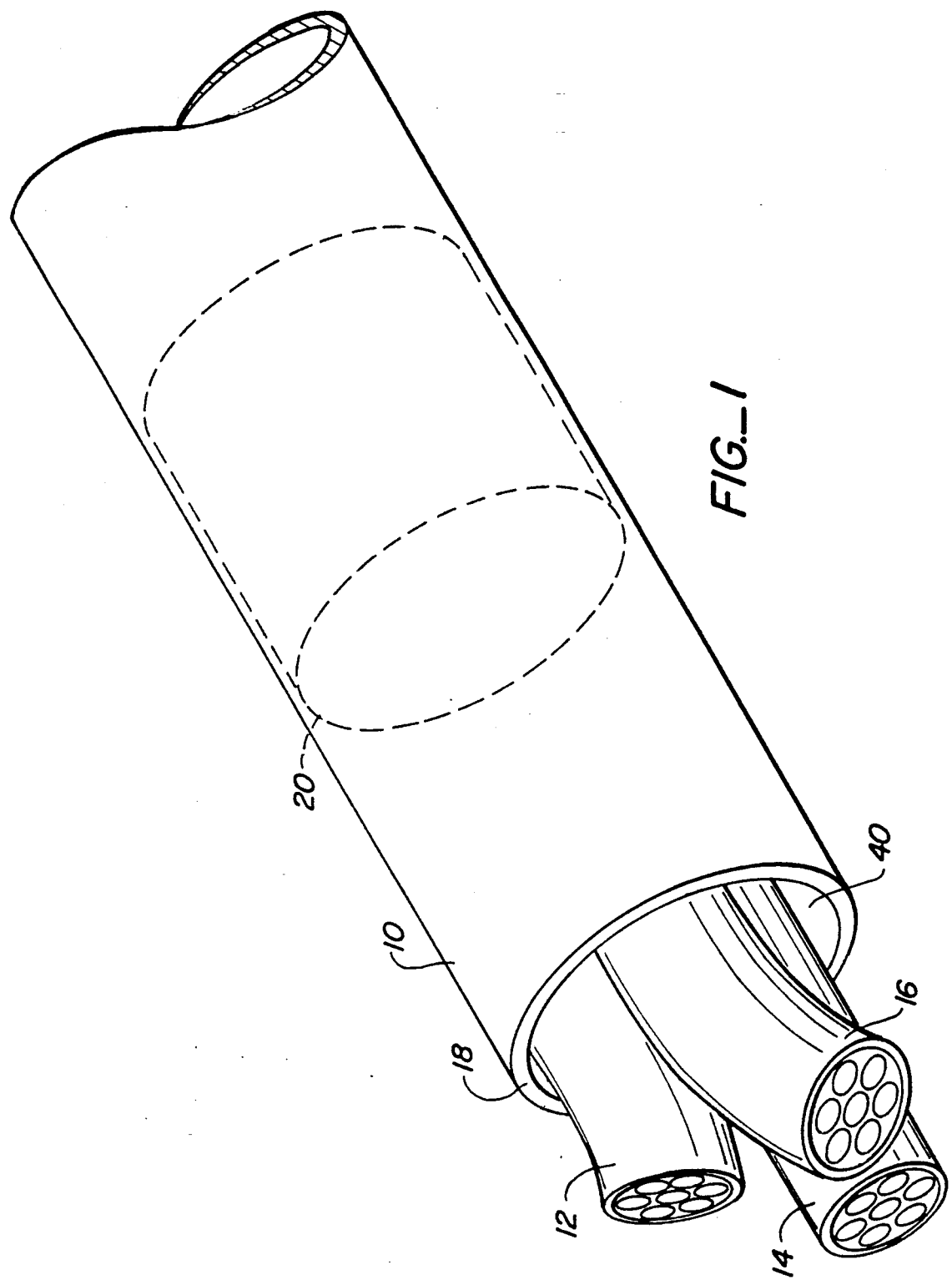
FIG._1

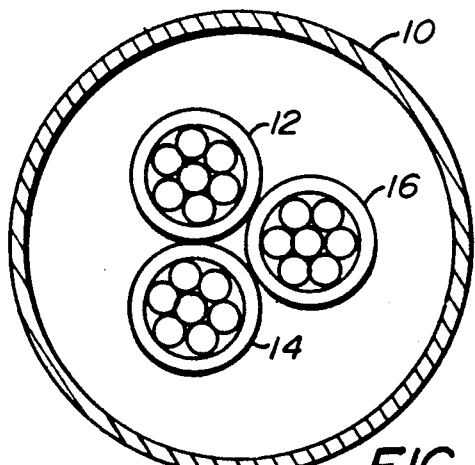
FIG._2
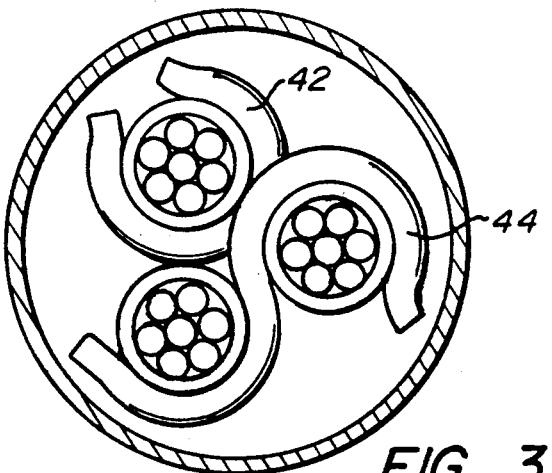
FIG._3
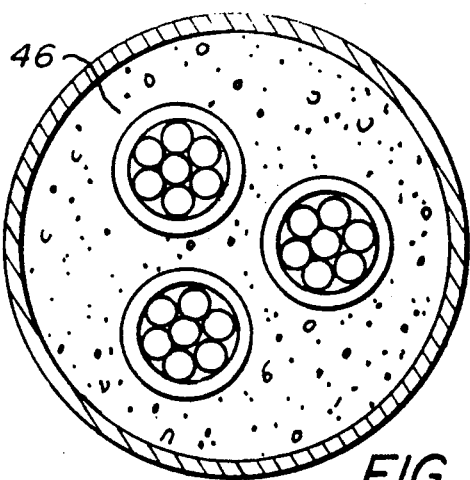
FIG._4
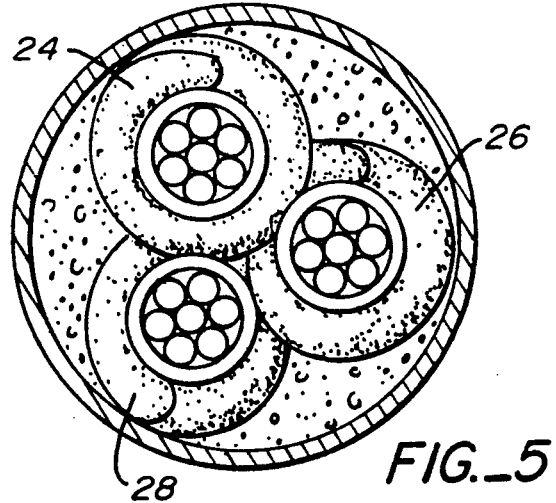
FIG._5
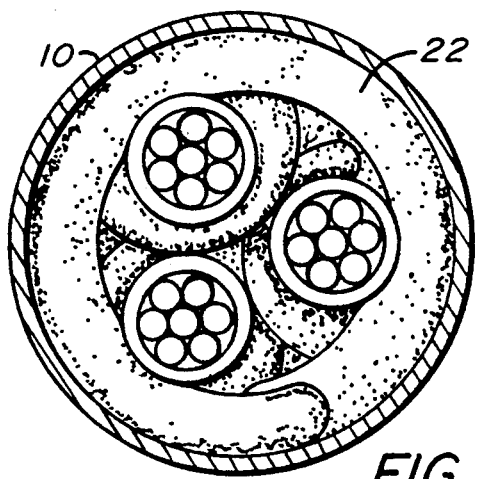
FIG._6
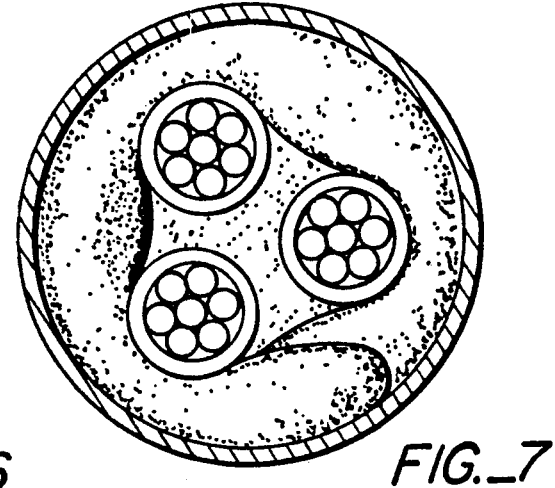
FIG._7

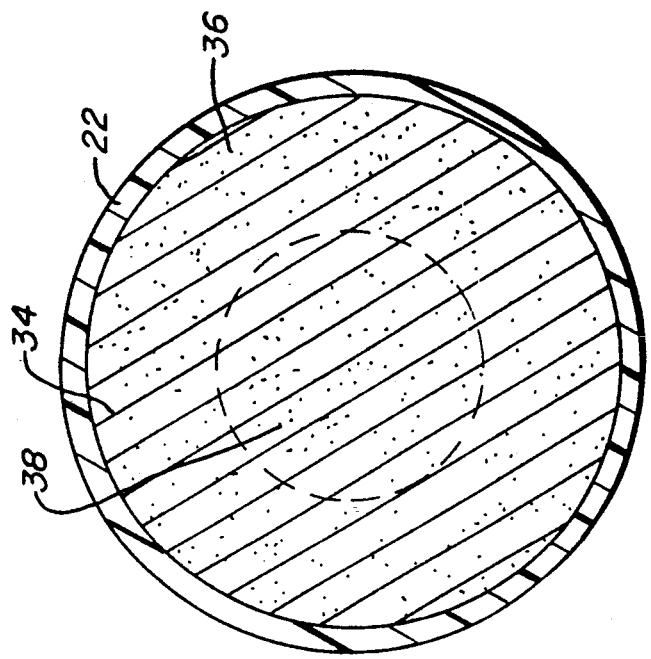
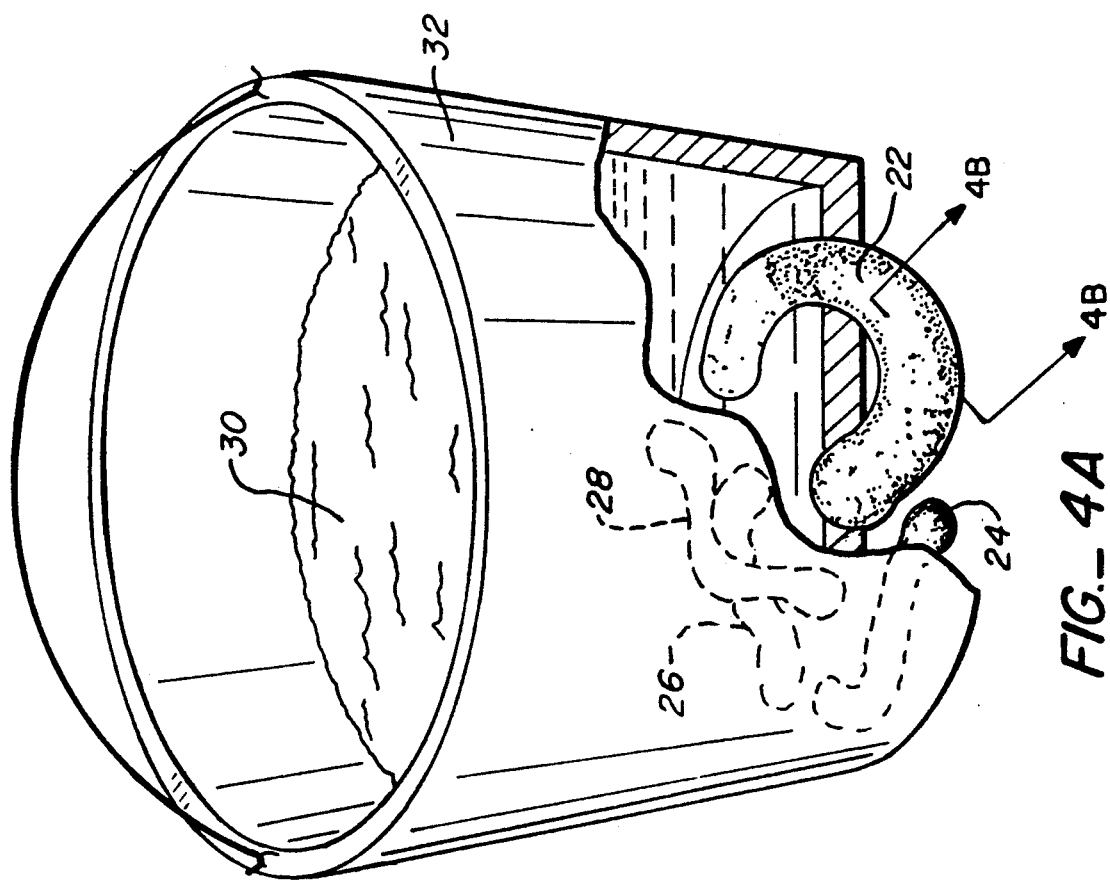

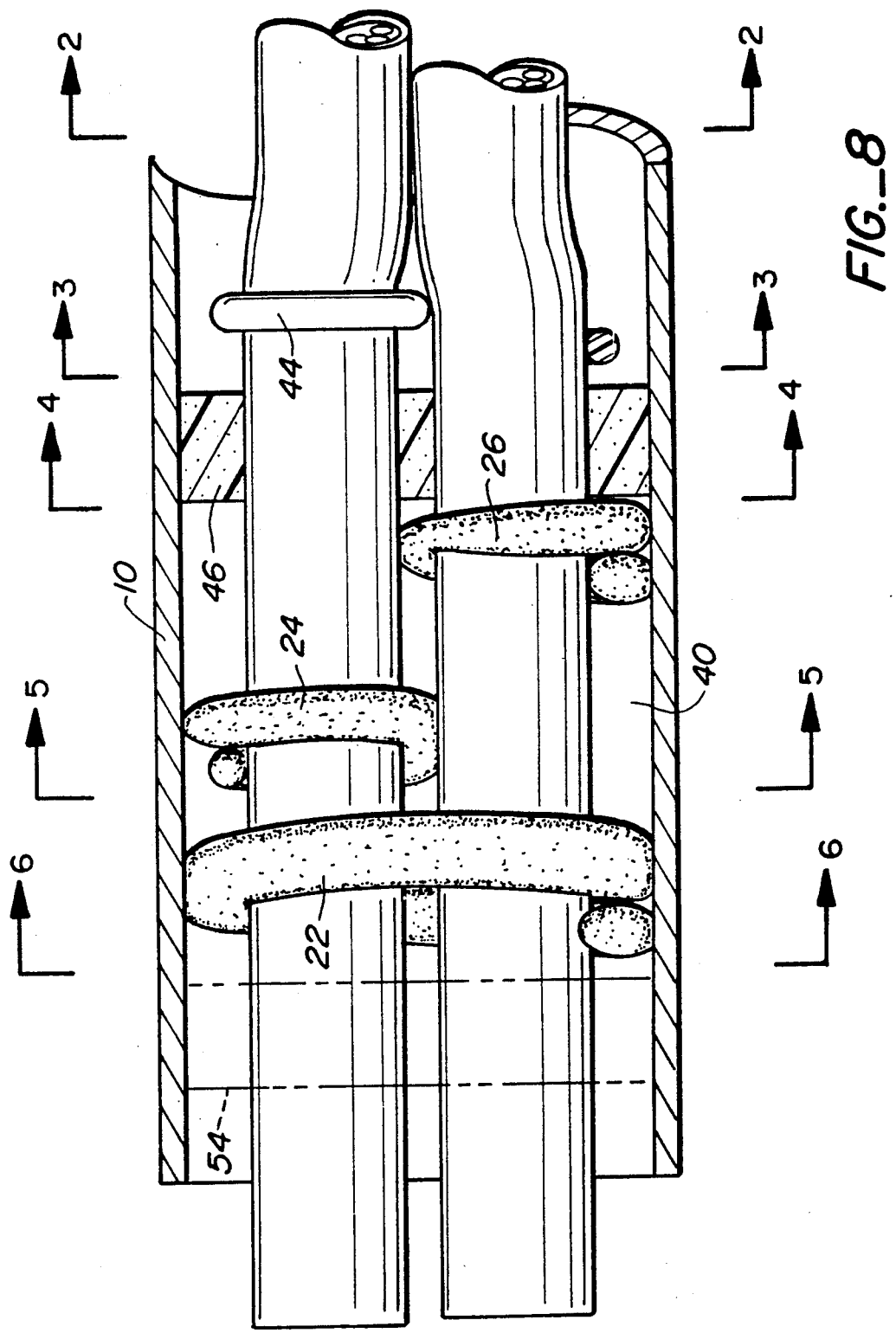
FIG._8

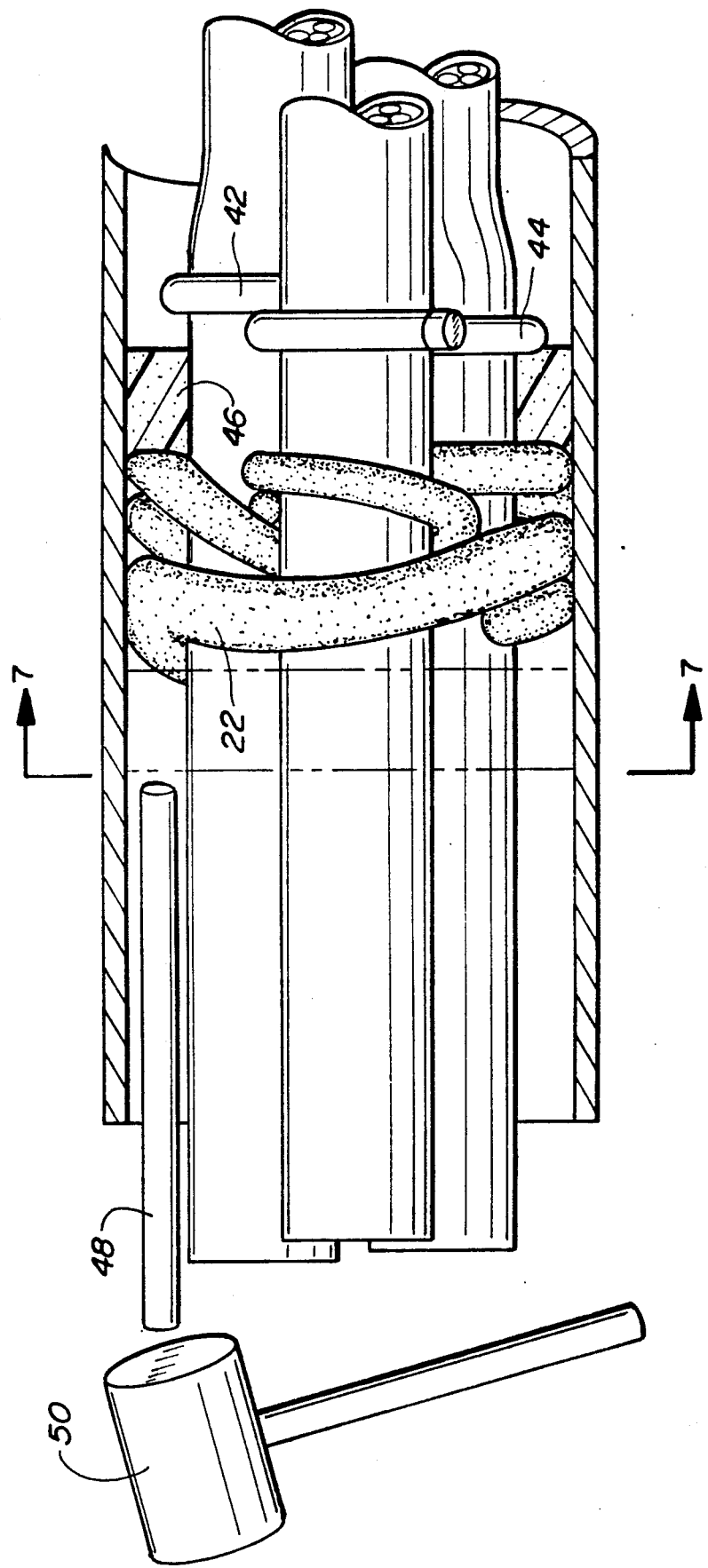
FIG._8A

LIQUID BARRIER SYSTEM

TECHNICAL FIELD

This invention relates to a system for forming a barrier within a passageway to substantially prevent the flow of liquid within the passageway. While the system of the present invention has application in a wide variety of operational contexts, it is particularly applicable for use in forming a water stop in conduits disposed underground, such as those housing electrical cables. The system quickly and effectively forms a water stop even when water already exists in the conduit passageway or when one or more cables within the conduit present a passageway which is highly irregular in shape.

BACKGROUND ART

Mechanical plugs of various types are well known expedients for plugging conduits and other passageway defining means. Mechanical plugs, however, present problems when utilized to form a water stop in conduits having electrical cables therein. First of all, cables must normally be precisely centered relative to the conduit to permit insertion of a mechanical plug into the conduit. This condition does not always exist.

Furthermore, when a plurality of cables are disposed in a conduit, many irregular shaped voids will be formed in the passageway cross section, voids which mechanical plugs are often unable to fill. For example, voids created by concentric neutrals on electrical cables cannot be effectively sealed with the mechanical plug approach. Also, mechanical plugs can exert a very high degree of pressure against cables within a conduit. This can "neck-down" or even fracture insulation, especially when high heat conditions exist, which can cause shorting. Also, heavy cables, can, over time, distort the plug and break the seal.

Mechanical plugs present problems even when used in conduits or other forms of passageway defining means not housing cables if the passageway is out of round or irregular shaped. Expansion of a mechanical plug in such an operational environment will not completely seal the passageway and thus will allow leakage.

Polyurethane foams have been used to form plugs in conduits. However, such foams can create hazardous conditions. For example, when exposed to flame, such foams can generate poisonous gases. Also, at least one constituent material of polyurethane has been shown to be carcinogenic.

U.S. Pat. No. 4,751,947, issued June 21, 1988 to Phillip G. Landers, discloses a system for plugging a conduit wherein a liquid epoxy foam system is foamed insitu within a conduit to form a plug. However, epoxy foams are often not water compatible and are unable to create a fluid-tight barrier within a conduit which has running water therein or is otherwise characterized by high-moisture conditions.

U.S. Pat. No. 4,773,792, issued Sept. 27, 1988 to Phillip G. Landers, relates to a system for stabilizing structural elements wherein a liquid epoxy foam system is foamed insitu between the structural elements. The foam system is in a flexible container and some of the foaming agent migrates through the container wall to form a bond with a structural element. This epoxy foam based system is inappropriate and inadequate for use in wet passageways to form a plug.

DISCLOSURE OF INVENTION

The present invention relates to an improved system for forming a water stop or liquid barrier within the passageway of passageway defining means such as a conduit. The method and apparatus of the system can be employed as either a temporary or a permanent water stop and are effective for such purpose even when the passageway contains a considerable amount of water. Furthermore, the method and apparatus of the present invention can form an effective liquid barrier even when a plurality of cables (even those having concentric neutrals) are disposed in the conduit or when the passageway defined by the passageway defining means otherwise has an irregularly-shaped cross section.

According to the described embodiment of the method of the present invention, a container having a permeable wall defining a plurality of apertures is at least partially filled with a particulate hydrophilic material. After the filling step, the at least one container is exposed to liquid, preferably water, and even more preferably water containing an adhesive material. Such exposure is maintained a sufficient period of time for particulate hydrophilic material in the container immediately adjacent to the permeable wall to absorb the liquid.

The container is removed from the liquid and positioned within the passageway of a conduit or other passageway defining means while the particulate hydrophilic material immediately adjacent to the permeable wall is moist with the water absorbed thereby.

Pressure is exerted on the container while the container is within the passageway to force at least some of the moist particulate hydrophilic material outwardly from the interior through the apertures and into engagement with the passageway defining means to form a water stop or barrier.

The preferred particulate hydrophilic material is clay, and even more preferably, bentonite.

In the illustrated preferred embodiment of the invention, the container is removed from the liquid before all of the particulate hydrophilic material within the interior thereof has absorbed the liquid. Exposure of the container contents to water within the passageway will cause same to be absorbed to some extent by the dry particulate hydrophilic material, resulting in expansion thereof to create an even tighter fit with the conduit.

Other features, advantages, and objects of the present invention will become apparent with reference to the following description and accompanying drawings.

BRIEF DESCRIPTION OF DRAWINGS

FIG. 1 is a perspective view of a portion of a conduit having electrical cables protruding therefrom, with a fluid barrier constructed in accordance with the teachings of the present invention being designated somewhat schematically by dotted lines;

FIG. 2 is a somewhat schematic cross-sectional view taken along the line 2—2 of FIG. 8;

FIG. 3 is a view similar to FIG. 2 and taken along the line 3—3 of FIG. 8;

FIG. 4 is a view similar to FIG. 2 but taken along the line 4—4 of FIG. 8;

FIG. 4A is a perspective view of a receptacle filled with water with a portion thereof broken away to illustrate a container filled with particulate hydrophilic material located therein;

FIG. 4B is a somewhat schematic, cross-sectional, enlarged view taken along the line 4B—4B in FIG. 4A;

FIG. 5 is a view similar to FIG. 2 but taken along the line 5—5 of FIG. 8;

FIG. 6 is a view similar to FIG. 2 but taken along the line 6—6 of FIG. 8;

FIG. 7 is a cross-sectional view taken along the line 7—7 of FIG. 8A;

FIG. 8 is an enlarged cross-sectional side view of a conduit illustrating various components of the barrier system constructed in accordance with the teachings of the present invention; and FIG. 8A is a view similar to FIG. 8 and illustrating in somewhat schematic form one of the steps carried out when practicing the method of the invention.

BEST MODE FOR CARRYING OUT THE INVENTION

Referring now to the drawings, an underground conduit 10 is illustrated. More particularly, and by way of example, conduit 10 is an electrical conduit and has electric cables 12, 14, 16 disposed therein. The cables project from an open end 18 of the conduit which may, for example, be located at a junction box.

It is often desirable to provide a water stop or barrier within the interior of conduits such as conduit 10. As mentioned above, this can be a difficult task when utilizing prior art approaches, particularly when the passageway already has water therein. Cables such as cables 12, 14, 16 make the task even more difficult because of the irregular nature of the passageway cross section that they create.

In FIG. 1, a barrier constructed in accordance with the teachings of the present invention is illustrated in somewhat schematic fashion by dash lines and designated by reference numeral 20. Such barrier is formed through use of containers of a specific character and having a particular type of material disposed therein. The drawings illustrate four such containers, containers 22, 24, 26 and 28. As may clearly be seen, container 22 is somewhat larger than the other containers; however, in the illustrated embodiment all of the containers are formed of the same type of material and have the same contents.

Each container is in the form of a sleeve closed at the ends and constructed of a material such as cheese cloth so that the cylindrical wall of the container defines a plurality of apertures.

Contained within each of the containers is a particulate hydrophilic material, preferably clay, and even more preferably bentonite. After each container is filled with the particulate hydrophilic material (which is dry during such filling) the sleeve-like container is sewn or otherwise closed at its ends to maintain the material therein.

As illustrated in FIG. 4A, the containers are immersed in water 30 contained in a receptacle such as bucket or pail 32. The containers are kept in the water for a predetermined period of time which will depend upon such factors as the size of the containers and the water absorption characteristics of the particulate hydrophilic material in the containers.

The objective is to leave the containers in the water a sufficient period of time to enable the particulate hydrophilic material in each container immediately adjacent to the permeable wall thereof to absorb the water. However, the containers should not stay in the water long enough for all of the particulate hydrophilic material therein to become wet. In other words, some of the particulate hydrophilic material spaced from the outer wall of the container should remain dry. FIG. 4B is a cross-sectional representation of container 22 with the particulate hydrophilic material having a wet or moistened zone 36 and a dry zone 38.

Upon their retrieval from the water in pail 32, the containers will be positioned in the passageway 40 defined by conduit 10 and cables 12, 14, 16. Before this is done, however, the cables should be separated. One way to accomplish this is by forcing between the cables flexible elements 42-44 (FIG. 3). The flexible elements may, for example, be cords or tubes formed of plastic or the like. Whatever the expedient utilized, the objective is to provide some degree of separation between the cables. A tapered dowel wedged between the cables could accomplish the same result.

The next step is to insert into the passageway an obstruction such as a resilient plug 46 formed of expanded-cell polyethylene or the like. Alternatively, other forms of obstruction might be utilized such as cloth stuffed about the cables. Plug 46 not only provides a temporary stop for any water which might be passing through the conduit 10 but also, as will be seen below, provides a degree of support which is helpful when carrying out subsequent steps of the invention method. When a plug of expanded cell polyethylene or the like is utilized as the obstruction, the plug is compressed during insertion thereof into the passageway. Since the plug is larger than the inner dimensions of the conduit 10, it will be maintained under compression while disposed in the conduit.

It is at this stage of the operation that the containers are inserted into the passageway. As shown in FIGS. 5 and 8, each of the containers 24, 26, 28 are wrapped about a cable. After this has been accomplished, the larger container 22 is looped, as shown in FIGS. 6 and 8, about all three cables with the outer wall thereof in engagement with the inner wall of conduit 10.

The next step is to exert pressure on the containers 22-28 to urge them against one another and against the obstruction or plug 46. This may be accomplished through the simple expedient of placing a stick against the containers and pounding the stick with a mallet 50 (FIG. 8A).

Not only does pounding push the containers against the plug 46, it forces at least some of the moist particulate hydrophilic material outwardly from the interior of each container through the apertures formed therein. Pounding continues at different locations on the containers until all the voids within the passageway at the location of the containers are filled with the material extruded from the container apertures. This will include voids comprising the creases formed in the containers themselves when they were bent during insertion into the passageway. When pounding terminates, the cross section will be as represented in FIG. 7. Even if the outer surfaces of the cables incorporate concentric neutrals or have other irregularities a water-tight barrier will have been created.

Bentonite is a material which expands when wetted so the barrier created as just described will, if anything, become more effective as the bentonite expands when subjected to moisture. The bentonite or other particulate hydrophilic material remaining in the containers may be thought of as a first portion of such material. The material forced from the containers may be considered a second portion. In the completed barrier the second portion of particulate hydrophilic material is in engagement with both the passageway defining means and the first portion of such material. The dry zone of the first portion of particulate hydrophilic material in each container represents, in essence, a reserve which may be called upon to further improve sealing between the cables and conduit when the dry material is subjected to additional moisture. To encourage such moisture, a second obstruction or plug 54 (FIG. 8) may be inserted into the passageway 40 to define along with plug 46 a closed chamber in the passageway. That is, such chamber will tend to remain moist and not dry out. This will be due not only to the moisture carried into the passageway by the containers and their contents during initial placement but by any resident moisture trapped in the conduit between the plugs as well.

It has been found that the addition of an adhesive to the particulate hydrophilic material greatly improves the shear strength of the stop or plug after it has been installed in a conduit or other passageway defining means. The adhesive may be added to the dry particulate hydrophilic material in the container or it may be in the liquid employed to moisten the material in the container prior to insertion of the container into the passageway. Examples of suitable adhesives are those selected from the families of cellulose gum or polyvinyl acetate. Adhesives of this type will provide a bond between the container and the interior surface of the conduit or other passageway defining means to further resist relative movement therebetween once installed.

Insofar as particle size of the hydrophilic particulate matter is concerned, it is preferred that such size be quite small. For example, in the case of bentonite, such material is preferably ground to a particle size of 200 mesh or smaller.

In the method of the invention disclosed above, pounding on the container was the expedient employed to exert pressure on the container in the passageway to force at least some of the moist particulate hydrophilic material outwardly from the container interior through the apertures of the container and into engagement with the passageway defining means to form the barrier. Although such approach is preferred, it is also possible to exert pressure on the container internally rather than externally. That is, by employing a particulate hydrophilic material with a high ratio of expansion when wetted. The expanding material itself may be sufficient to extrude some of the moistened material through the container apertures and into engagement with the passageway defining means to form a barrier.

I claim:

1. A method of forming a barrier within the passageway of passageway defining means to substantially prevent the flow of liquid within said passageway, said method comprising the steps of:
   at least partially filling the interior of at least one container having a permeable wall defining a plurality of apertures with a particulate hydrophilic material;
   after said filling step, exposing the at least one container to liquid;
   maintaining said at least one container exposed to said liquid a sufficient period of time for at least the particulate hydrophilic material in said container immediately adjacent to said permeable wall to absorb said liquid;
   removing said at least one container from substantial exposure to nonabsorbed liquid after passage of said period of time;
   positioning said at least one container within the passageway while the particulate hydrophilic material immediately adjacent to said permeable wall is moist with the liquid absorbed thereby; and
   exerting pressure on said at least one container while said at least one container is within the passageway to force at least some of said moist particulate hydrophilic material outwardly from said interior through said apertures and into engagement with said passageway defining means to form said barrier.

2. The method according to claim 1 wherein said particulate hydrophilic material at least partially comprises clay.

3. The method according to claim 2 wherein said clay is bentonite.

4. The method according to claim 1 wherein a plurality of said containers are positioned in said passageway.

5. The method according to claim 1 wherein said at least one container is removed from substantial exposure to said nonabsorbed liquid before all of said particulate hydrophilic material within the interior thereof has absorbed said liquid.

6. The method according to claim 1 additionally comprising the step of inserting an obstruction into said passageway prior to the step of positioning said at least one container within the passageway.

7. The method according to claim 6 wherein the step of exerting pressure on said at least one container comprises pounding said at least one container while said at least one container engages said obstruction.

8. The method according to claim 6 wherein said obstruction is a resilient plug bearing against said passageway defining means and wherein said method additionally comprises the steps of compressing said plug during insertion thereof into said passageway and maintaining said plug under compression during said step of exerting pressure on said at least one container.

9. The method according to claim comprising the additional step of expanding at least some of said particulate hydrophilic material within said at least one container after positioning thereof into said passageway.

10. The method according to claim 9 wherein said expanding step is at least partially carried out by moistening dry particulate material disposed within said at least one container with moisture with said passageway.

11. The method according to claim 4 further comprising the step of bringing at least some of said containers into engagement within said passageway.

12. The method according to claim 1 wherein said passageway defining means comprises a conduit and at least one cable disposed in said conduit, and wherein said positioning step includes the step of wrapping said at least one container at least partially around said at least one cable.

13. The method according to claim 6 additionally comprising the step of inserting a second obstruction into said passageway after the step of exerting pressure on said at least one container, said second obstruction and the obstruction inserted into the passageway prior to said positioning step forming a substantially closed chamber accommodating said at least one container.

14. The method according to claim 12 wherein a plurality of cables are disposed within said conduit, said method comprising the additional steps of separating said cables from one another and maintaining such separation with said at least one container.

15. The method according to claim 1 comprising the step of adding adhesive to said particulate hydrophilic material before positioning said at least one container within the passageway.

16. A method of forming a barrier within the passageway of passageway defining means to substantially prevent the flow of liquid within said passageway, said method comprising the steps of:

at least partially filling the interior of at least one container having a permeable wall defining a plurality of apertures with a particulate hydrophilic material;

after said filling step, exposing the at least one container to liquid;

maintaining said at least one container exposed to said liquid a sufficient period of time for particulate hydrophilic material in said container immediately adjacent to said permeable wall to absorb said liquid;

removing said at least one container from said liquid before all of the particulate hydrophilic material within the interior thereof has absorbed said liquid;

positioning said at least one container within the passageway while at least the particulate hydrophilic material immediately adjacent to said permeable wall is moist with the liquid absorbed thereby;

exerting pressure on said at least one container while said at least one container is within the passageway to force at least some of said moist particulate hydrophilic material outwardly from said interior through said apertures and into engagement with said passageway defining means to form said barrier; and after said positioning step, expanding at least some of the particulate material within said at least one container.

17. A method of forming a barrier within the passageway of passageway defining means to substantially prevent the flow of liquid within said passageway, said method comprising the steps of:

at least partially filling the interior of at least one container having a permeable wall defining a plurality of after said filling step, exposing the at least one container to liquid;

maintaining said at least one container exposed to said liquid a sufficient period of time for at least the particulate hydrophilic material in said container immediately adjacent to said permeable wall to absorb said liquid; and exerting pressure on said at least one container within the passageway while the particulate hydrophilic material immediately adjacent to said permeable wall is moist with the liquid absorbed thereby to force at least some of said moist particulate hydrophilic material outwardly from said interior through said apertures and into engagement with said passageway defining means to form said barrier.

18. In combination:
means defining a passageway;
at least one container positioned in said passageway, said container having a permeable wall defining a plurality of apertures;
a, first portion of particulate hydrophilic material disposed in said at least one container;
a second portion of particulate hydrophilic material disposed externally of said container and in engagement with both said passageway defining means and said first portion of particulate hydrophilic material to at least partially form a barrier substantially preventing the flow of liquid in said passageway and wherein said first portion of particulate hydrophilic material is moist wherein the moisture varies from a fairly moist condition immediately adjacent to said permeable wall to a substantially dry condition at a location spaced from said permeable wall, and wherein said second portion of particulate hydrophilic material is fairly moist.

19. The combination according to claim 18 wherein said particulate hydrophilic material at least partially comprises clay expandable when moisture is applied thereto.

20. The combination according to claim 19 wherein said clay is bentonite.

21. The combination according to claim 18 wherein said passageway defining means comprises a conduit and at least one cable disposed in said conduit, said at least one container being at least partially wrapped around said at least one cable.

22. The combination according to claim 19 wherein the clay is finely ground.

* * * * *